United States Patent

Vall

[11] 4,200,053
[45] Apr. 29, 1980

[54] MOORING CINCH
[75] Inventor: Seymour Vall, New York, N.Y.
[73] Assignee: Falcon Safety Products, Inc., Mountainside, N.J.
[21] Appl. No.: 862,957
[22] Filed: Dec. 21, 1977
[51] Int. Cl.² ............................................. B63B 21/00
[52] U.S. Cl. ................................ 114/230; 24/81 CC; 294/78 R
[58] Field of Search .................. 114/218, 230, 270; 294/74, 78 R; 24/115 H, 129 A, 81 CC, 135 R, 135 K

[56] References Cited
U.S. PATENT DOCUMENTS

| 855,159 | 5/1907 | Brown | 294/78 R |
| 1,764,380 | 6/1930 | Allen | 24/129 A |
| 2,621,968 | 12/1952 | Vickroy | 24/81 CC |
| 2,808,632 | 10/1957 | Cline | 24/115 A |
| 3,307,870 | 3/1967 | Archer | 294/74 |
| 3,310,333 | 3/1967 | Hutson | 294/78 R |
| 3,906,592 | 9/1975 | Sakasegawa | 24/81 CC |

Primary Examiner—Charles E. Frankfort
Assistant Examiner—D. W. Keen

[57] ABSTRACT

The present disclosure relates to a mooring cinch useful in locking a mooring pennant onto a mooring cleat. The mooring cinch is constructed of a strong flexible plastic shaped material which is adapted to accept two strands of rope consisting of opposing sides of the eye of a mooring pennant in a central cavity. Upon tightening of a centrally disposed nut and bolt, the mooring cinch can be secured to the cleat in any easy and non-slipping manner.

5 Claims, 4 Drawing Figures

MOORING CINCH

BACKGROUND OF THE INVENTION

U.S. Pat. No. 3,094,755 discloses a rope and connector assembly which can be utilized in forming a simple loop in a single length of rope to serve as a means for securing of a boat to a dock piling or bollard. The connector comprises an elongated, rigid, non-deformable connector body having parallel portions for receiving separate rope sections. In the loop embodiment above, a length of rope is passed through one passage, formed into a loop and returned in the opposite direction through the second, parallel passage. The free end of the rope extending out from the second passage is knotted with a knot having a larger size than the passage thus securing the rope loop. The loop is passed over the dock piling or other securing structure. Tightening of the loop is accomplished by increasing tension to the rope connection. It should be noted however, that movement of a vessel towards the dock by wave or tide action will result in reduction of tension and thus loosening of the rope loop.

U.S. Pat. No. 3,878,808 discloses a combination boat hook and mooring apparatus comprising a longitudinally extending tubular handle with a transversely disposed T-head at one end and with a stiff flexible cord extending through the tubular handle and forming a loop adjacent to the T-head end with the opposite end of the flexible cord extending out of the opposite end of the handle to provide a means for closing the loop formed by the cord adjacent the T-head end. The loop is secured by applying tension to the rope.

U.S. Pat. No. 3,780,690 relates to line post couplings comprising a post with an enlarged head and with mounting members including a fixed or movable clevis member whereby a line with a loop may be quickly attached and detached without the necessity of tying or untying knots. The device, with some slight modification may be mounted on dock pilings, bollards, or lock walls with or without a float member.

While the above patent literature reflects the state of the art as set forth in publications it should be noted that on a practical level procedures actually employed in the mooring of vessels particularly pleasure yachts is somewhat different. Thus on pleasure yachts the method of mooring employed to prevent wave action from lifting the eye of a mooring pennant over the mooring cleat, bit or samson post is as follows:

1. A piece of light line is permanently attached to the eye of the pennant.
2. The eye is placed over the mooring cleat.
3. The light line is passed once or twice around the open part of the eye, just below the cleat.
4. The line is drawn tight, closing the eye around the cleat.
5. The line is fastened to the cleat using a suitable hitch.

While the above method does work in practice, it does differ from a number of disadvantages:
1. It is difficult to accomplish in a heavy sea;
2. It is difficult to tie or release in the dark;
3. It is difficult to release under strain;
4. It is difficult to release when wet;
5. Both tying and releasing require some knowledge of proper cleating procedure.

The last item is important as the release and retrieval of the mooring pennant on a plesure yacht is usually given to a guest who may have little or no knowledge of seamanship.

DESCRIPTION OF THE INVENTION

The present invention relates to a novel mooring cinch which provides a simple, fast, positive lock for the mooring pennant of a vessel. When in operative position, the subject mooring cinch will prevent wave action from lifting the eye of the mooring pennant over the mooring cleat. Evidently if the eye of the pennant is allowed to lift over the mooring cleat, the vessel would drift free.

In operation, the mooring cinch of this invention is fitted around the eye of the mooring pennant while the cinch is in an "open" or disengaging configuration. Sliding the mooring cinch under the horn of the mooring cleat closes the pennant eye around the cleat. Tightening a fastening means such as a wingnut-bolt combination serves to close the cinch and place it in the engaging configuration. The mooring pennant eye is thereby secured to the cleat. Reversing the procedure frees the mooring pennant from the cleat. Thus the instant mooring cinch provides a fast, safe, easy and positive device to effect mooring which does not require any special skill or knowledge to operate and which can be successfully employed even by the sailing novice even under adverse conditions.

BRIEF DESCRIPTION OF THE DRAWINGS

The mooring cinch of the present invention is more clearly understood by reference to the accompanying Drawing. FIGS. 1 and 2 represent top and side views of the mooring cinch 10 showing a centrally disposed hole 11 passing completely through the cinch from top to bottom. In a preferred embodiment the mooring cinch intended for use in yachts and small boats is constructed by molding or fabricating a strong, flexible plastic material such as polyethylene, propylene and the like. Hole 11 is drilled through the cinch 10 in such a manner so as to provide a tight fit for the bolt at one end while at the opposing end of the hole a sliding fit is provided.

In FIG. 3, an end view of the mooring cinch is shown. The preferred form of the device is seen to be an essentially oval shape with a slight central depression at the top and bottom so as to describe a figure eight in appearance. Such form of course is obtained only when the mooring cinch is in the engaging or closed configuration. To produce the closed configuration a bolt means 12 is inserted through the end of the centrally disposed hole described above which is drilled for a tight fit and passed out through the second end which has been drilled for a sliding fit. Wing nut means 13 is affixed to the end of the bolt and tightened. Compression of the wing nut on the mooring cinch 10 produces the figure eight conformation which serves to partially divide central cavity 14 into two chambers by bringing ridges 15 and 16 into closer proximity. The thus formed chambers are adapted to engage the two strands of the pennant eye as will hereinafter be described.

FIG. 4 is a schematic representation of the manner in which the mooring cinch is used to secure a mooring pennant to a cleat. The pennant eye 20, formed by looping one end of a mooring pennant 21 and maintaining the loop by means of eye splice 22, is placed under cleat 23 and secured in place by moving up mooring cinch 10 to the cleat and tightening wing nut 13.

Figure 1:
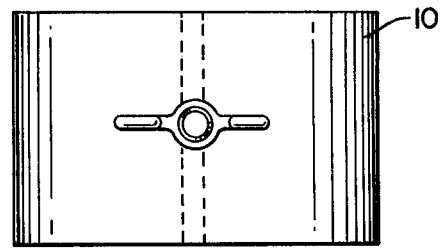
FIG. 1 is a perspective top view of the mooring cinch of the present invention.
Figure 3:
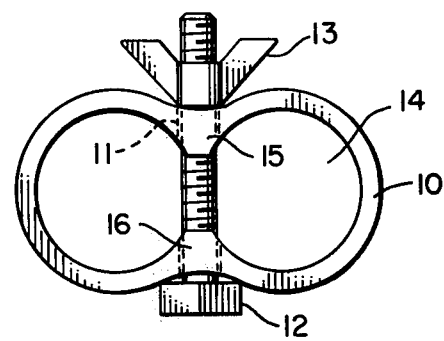
FIG. 3 is a perspective end view of the mooring cinch of the present invention.
Figure 2:
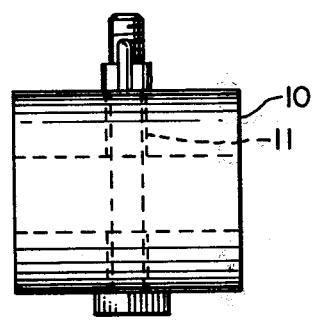
FIG. 2 is a perspective side view of the mooring cinch of the present invention.
Figure 4:
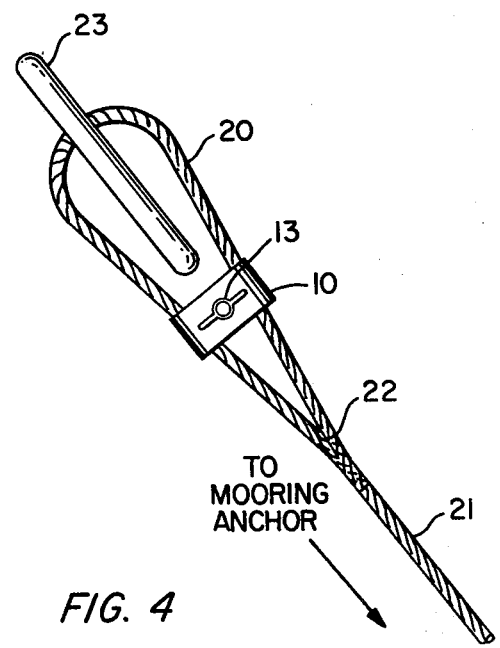
FIG. 4 is a schematic representation of a top view of the mooring cinch of the invention in use to engage a mooring penant onto a mooring cleat.

More specifically, the method of using the mooring cinch of the present invention can be described as follows:

To install the mooring cinch on a vessel's mooring pennant
(1) remove the bolt from the mooring cinch;
(2) push the eye of the mooring pennant through the center cavity of the mooring cinch which is in the open position;
(3) replace the bolt and attach the wing nut.

The mooring cinch can now be slid from the top of the eye to the eye splice while remaining captured within the loop of the mooring eye.

To engage the mooring cinch:
(1) slide the cinch toward the eye splice;
(2) place the eye of the mooring pennant over the mooring cleat;
(3) slide the cinch toward the cleat until the eye of the pennant is closed around it and the edge of the cinch is under the horn of the cleat; and,
(4) tighten the wing nut to prevent the cinch from backing off.

To release the mooring cinch:
(1) loosen the wing nut;
(2) slide the cinch toward the eye splice; and,
(3) lift the eye over the mooring cleat.

The mooring cinch will remain safely on the mooring pennant when the pennant is dropped overboard. When a worn pennant is replaced, the mooring cinch can be easily removed and installed on the new pennant.

The mooring cinch of the present invention may also be used on dock lines to secure the larger eyes of these lines to the vessel so that the other end may be passed freely ashore.

Two or three mooring cinches, used in combination, will prevent a double bridle mooring arrangement from twisting around itself thereby unlaying one or both pennants of the mooring arrangement while the vessel is absent from its mooring.

A double bridle consists of two mooring pennants each led through a chock on opposite sides of the vessel's bow. The pennants are then led to separate mooring cleats or to a common ccleat, bit or samson post. When released and in the water, the eye end of the pennants are kept afloat by a common tall buoy or pick-up float. When the vessel is absent from its mooring the action of the water tends to turn the float or tall-buoy, twisting the pennants around each other. This action will eventually unlay (separate the layers of fiber that make up the rope) of one or both pennants.

Two or three mooring cinches spaced between the eye splice and mooring chain of the pennants and connecting the pennants to each other, act as a bar and prevent the pennants from twisting around each other.

In a preferred embodiment of the invention the mooring cinch is cnstructed of plastic and is 2½ inches wide with the remaining dimensions 1½ inches each. The inside dimensions of the internal cavity is constructed to accept two strands of rope each having a maximum diameter of about 1 inch. The fastening bolt employed can be 3/16 or ¼ inch.

I claim:

1. A mooring cinch for securing a pennant eye to a cleat or similar support said mooring cinch being constructed of a strong, flexible plastic material and is further characterized in having a top, bottom, a central cavity extending from one end to the other end of said cinch, and fastening means passing through centrally disposed holes in said top and bottom and passing diammetrically through said central cavity said fastening means being arranged and constructed as to provide an open and closed position wherein in said open position the central cavity of said mooring cinch is essentially cylindrical in shape and can internally accept both strands of said pennant eye and in said closed position is drawn towards a figure eight like configuration wherein said strands of said pennant eye are individually secured within the openings of said figure eight of said mooring cinch.

2. The mooring cinch of claim 1 wherein said fastening means comprises a bolt and wing nut.

3. The mooring cinch of claim 2 wherein said holes in the bottom and top are obtained by drilling, said bottom hole being drilled for a tight fit of said bolt and said top hole being drilled for a sliding fit.

4. The mooring cinch of claim 1 wherein in said closed position said cinch has an essentially oval external shape.

5. The mooring cinch of claim 1 wherein a ridge running from one end to the other end of said cinch is provided at the bottom and at the top of said central cavity, which ridges are brought in closer proximity to each other in the closed position.

* * * * *